3,404,565
TOWED OCEANOGRAPHIC SENSOR SYSTEM
David T. Barry and Donald W. Branham, Dallas, Jack R. Strobel, Lewisville, and Billy J. Mullins, Carrollton, Tex., and Paul V. Hodge, Sydney, New South Wales, Australia, assignors to Texas Instruments Incorporated, Dallas, Tex., a corporation of Delaware
Filed May 7, 1965, Ser. No. 454,015
6 Claims. (Cl. 73—170)

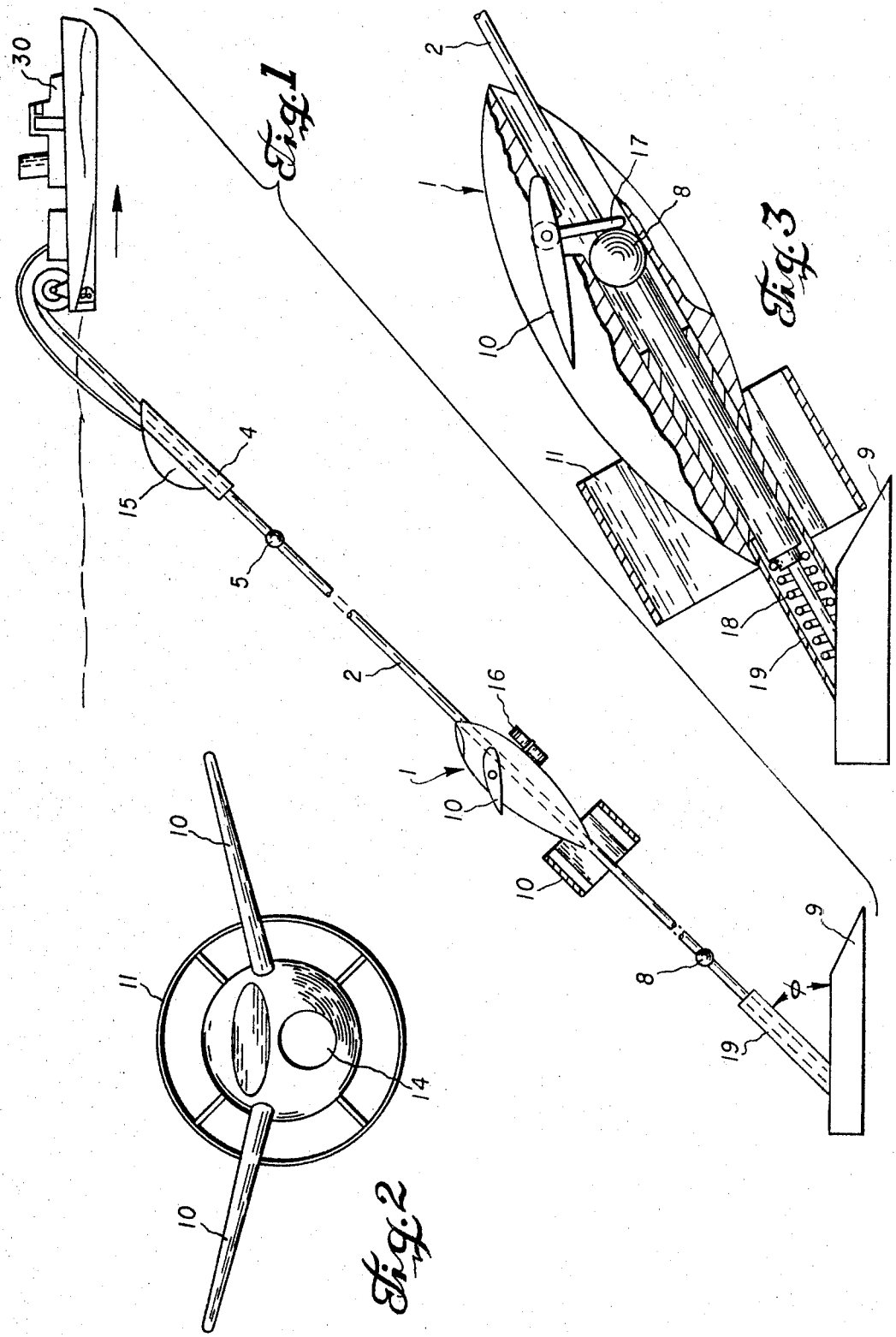

ABSTRACT OF THE DISCLOSURE

An oceanographic surveying system having a towed cable maintained in an extended position by a depressor attached to one end. A vessel containing various types of sensors is slidably mounted on the towed cable for traversal along the cable between two spaced end regions. A movable hydrofoil is connected to the vessel and is movable between two positions in order to cause selective movement of the vessel up and down the cable. Shock absorbers and trigger devices are located at each of the two end regions on the cable for stopping the movement of the vessel and changing the position of the hydrofoil to change the direction of travel of the vessel along the cable. Telemetering equipment contained within the vessel transmits sensed data to a receiver located near the upper end of the towed cable.

---

This invention relates to a system of apparatus and other equipment for obtaining oceanographic data, and more particularly to a system for obtaining data as a function of depth.

In making oceanographic measurements, a container of instruments is usually lowered over the side of a ship to a certain level at which readings are taken. To take readings at other levels, the container has to be raised or lowered and, in general, the readings have to be taken while the vessel is at a standstill in the water. If the measurements are made while the vessel is towing the container, the measurements are made at one level and only indicate data at that level.

A desirable system would be one with which measurements may be made continuously at various depths while the instrument container is being towed. Such a system would permit the plotting of profiles of the oceanographic data over various areas without having to stop and lower the instruments to various depths to get the required data therefrom, or change the depth of the towed container.

It is therefore an object of this invention to provide a system for obtaining oceanographic data while the instrument container is being towed by a vessel.

Another object of the invention is to provide an apparatus for obtaining data continuously as a function of depth.

A feature of the invention is an apparatus for oceanographic surveying which utilizes a flow of water past the sensing device to provide the lift or depression action by means of which the sensor depth may be varied.

Still another feature of the invention is a sensor container which will gather oceanographic data and transmit the data to a receiver via the media in which the container is traveling.

Other objects and features of the invention will become more readily understood from the following detailed description and appended claims when considered in conjunction with the accompanying drawings, in which like reference numerals designate like parts throughout the figures thereof, and in which:

FIGURE 1 is a functional diagram of one embodiment of the oceanographic survey system of the invention;

FIGURE 2 is an end view of a sensor container of one embodiment of the invention;

FIGURE 3 is a side view of the sensor container at the lower end of travel;

Figure 5:
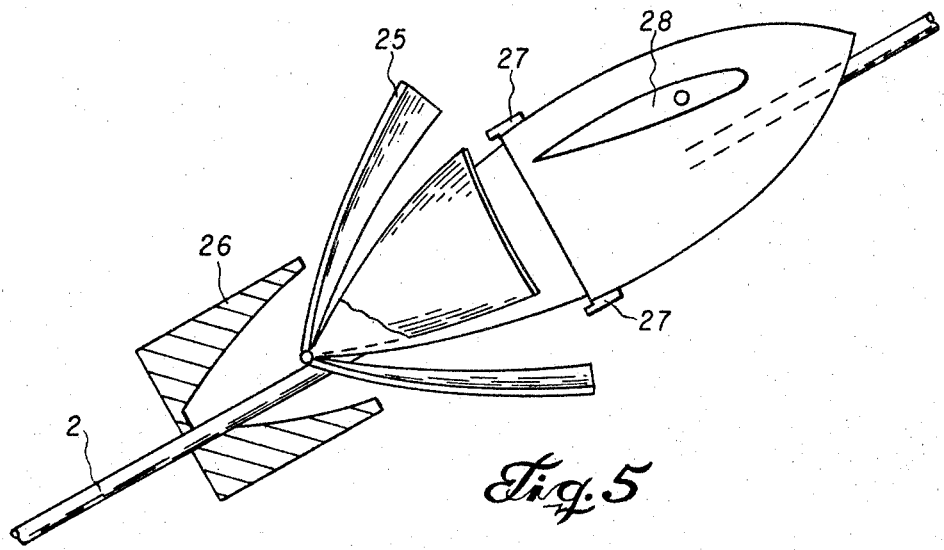
FIGURE 5 shows a second embodiment of a sensor container having drag fins.

The invention provides a method for obtaining oceanographic data as a function of depth from a moving vessel, while a sensor container moves up and down a cable utilizing the forces of the moving vessel against the force of the stream to provide the lifting and depressing function. The electrical power necessary for the internal electronics of the container may be storage batteries, thus eliminating electrical connections between the sensor container and the towing vessel.

Referring now to the drawings, FIGURE 1 shows a functional diagram of the sensor system of the invention. A sensor container or fish 1 is so mounted as to slide up and down cable 2. Fish 1 has a tiltable wing or hydrofoil assembly 10 which, when tilted up at the lower end of the cable, provides lift for the fish due to the fluid flow beneath the wings, causing the fish to travel up along the cable. When the wings are tilted down at the upper end of the cable, the pressure of the fluid against the surface of the wings provides a drag which forces the fish to slide down the cable. At the top of the cable, the sensor is stopped by shock absorber 4 and the ball 5. At the bottom of the cable the sensor is stopped by the shock absorber 19 and the ball 8 assembly. The manner and means by which the wings 10 are tilted up and down at the ends of the cable will be described hereinafter. The travel of the fish up and down along the cable will continue as long as it is being towed and water current is flowing about the wing assembly to provide either the lift or the drag sufficient to move the fish in one direction or the other. Cable 2 is maintained in a downward direction and held at an angle $\phi$ with respect to a horizontal plane by a depressor 9 at the outboard end of the cable.

Data is gathered by various sensors (not shown) within the fish and transmitted to a receiver 15 at the upper end of the cable. Transmission may be by sonar telemetry, thus eliminating the need for cables from the fish to the receiver. By using battery power for the sensors, a direct cable connection is not required. In order to maintain a charge on the batteries, a generator is included within the fish and is turned by some type of external wheel impeller, such as for example a Savonius rotor 16 illustrated in FIGURE 1; the location of the impeller wheel is not critical as long as it does not produce instability in the movements of the fish.

Typical sensing devices which may be included in the fish are pressure indicators, depth indicators, temperature sensors, salinity sensors, and any other type sensor may be included to gather data, which is transmitted through the water to the receiver 15 at the upper end of the cable.

FIGURE 2 is an end view of the fish showing the wings 10, the stabilizer 11, and an opening 14 large enough to permit the passing of the cable 2 therethrough and accommodate the shock absorber 4 and ball assembly 5 used in reversing the direction of the wing tilt. Stabilizer 11 is provided to oppose roll tendencies of the fish while being towed.

Figure 4:
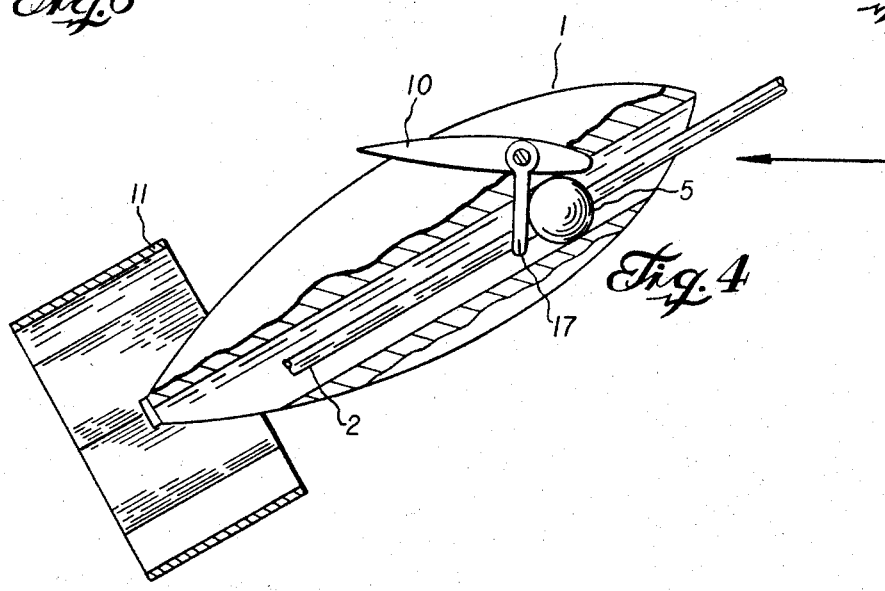
FIGURE 4 shows the sensor container at the upper end of its travel.

In FIGURE 3, the fish is shown at the lower end of the cable. The fish comes to rest against the shock absorber 19 which contains spring coil 18. Ball 8 enters the fish through the opening and actuates lever 17, tilting the leading end of the wing assembly 10 upward. The flow of the water past the fish against the upwardly tilted leading end of the wing assembly causes the fish to rise up the cable, transmitting data at various depths. On reaching the top of the cable as shown in FIGURE 4, the fish comes to rest against the shock absorber 4, ball 5 entering the front of the fish, actuating lever 17 and tilting the leading end of the wing assembly 10 downward. The water flowing across the wing assembly in this position forces the fish back down the cable until it comes to rest against the shock absorber 19 at the lower end, whereat the wing assembly is repositioned for upward travel as previously described. In the foregoing manner, the fish travels up and down the cable transmitting data from its sonar at the various levels while being pulled through the water.

Figure 6:
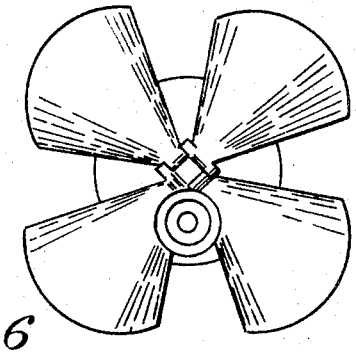
FIGURE 6 is an end view of the sensor container in FIGURE 5 with the drag fins open.
Figure 7:
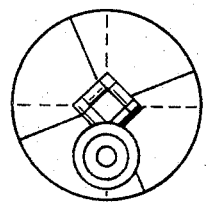
FIGURE 7 is an end view of the container in FIGURE 5 with the drag fins closed.

Another embodiment of the fish is shown in FIGURES 5–7. In this embodiment, the stabilizer 11 (of the embodiment illustrated in FIGURES 1–4) is replaced by drag fins 25. With the drag fins open as shown in FIGURE 5, the water forces the fish down the cable. Upon reaching the end of the cable, the fins are forced closed by the cup-shaped stop 26 at the end of the cable. The force of the fish traveling downward urges the fish into the stop 26, closing the drag fins 25 and latching them closed with the latches 27. With the drag fins closed, the fish is then free to rise to the top of the cable, the wing 28 being fixedly positioned to provide the necessary lift, thus allowing the fish to rise to the top of the cable whereat a release mechanism (not shown) may be used to release the drag fins 25 allowing them to open and pull the fish again to the bottom of the cable. The drag assembly 25 is hinged at the back of the fish, and when open, flares out to cause a drag, thus exerting a downward force.

FIGURE 6 is an end view of the fish showing the drag fins 25 open, while FIGURE 7 is an end view of the fish showing the drag fins closed.

On the upward travel of the fish, stability is achieved by maintaining the center of lift above the downward tension point exerted by the cable. Also, the wings are tilted slightly upward so that if a tendency to roll exists, the wings will display a greater area, resulting in an increase in lift. This automatically stabilizes the fish. In the downward travel, the wings still resist roll since the water flow is in the same direction.

Although the present invention has been shown and illustrated in terms of specific preferred embodiments, it will be apparent that changes and modifications are possible without departing from the spirit and scope of the invention as defined in the appended claims.

What is claimed is:

1. In a survey system, the combination of a tow cable, a depressor attached to one end of said cable to maintain said cable in an extended condition, an instrument container including a movable hydrofoil, said container being slidably mounted upon said cable for traversal thereover between two spaced points on said cable, and two shock absorbers, one of said two shock absorbers being secured to each said spaced point on said cable for stopping the travel of said instrument container in one direction and moving said hydrofoil to change the direction of travel of said instrument container to the opposite direction.

2. In a survey system, the combination of a towed cable, a depressor attached to one end of said cable to maintain said cable substantially in an extended linear condition, an instrument container slidably mounted on said cable, said instrument container having telemetering equipment therein and a movable hydrofoil assembly thereon movable between two fixed positions, one of said positions creating a downward force and the other of said positions creating an upward force, and two shock absorbers each including a trigger device, one of each of said shock absorbers and trigger devices being located near each end region of said cable to stop the travel of said instrument container and position said hydrofoil assembly in one of said positions to reverse the direction of travel of said instrument container on said cable.

3. In an oceanographic survey system towed by a vessel, the combination comprising an instrument container having data sensors and telemetry equipment therein, a tow cable connected at one end to said vessel, said instrument container being slidably mounted on said cable and including means causing movement of said instrument container along said cable in either direction, depressor means secured to said cable to maintain said cable in a relatively taut downwardly extended condition, means mounted at spaced points on said cable for reversing the direction of travel of said instrument container, and receiver means mounted to receive the data transmitted by said telemetry equipment.

4. The survey system as defined in claim 3 wherein said instrument container includes hydrofoil means rotatably mounted thereon to force said container up said cable when in one position and force said container down said cable when rotated to another position, and stabilizer means to prevent rolling of said container while being towed through water.

5. The survey system as defined in claim 3 wherein said instrument container includes hydrofoils positioned to provide a lift to said container incident to the flow of water past said container while being towed, and hinged drag fins to create drag to pull said container down said cable when said fins are in an open position.

6. The survey system comprising:
   (a) a tow cable having means to maintain said cable in a downwardly extended position when towed through a fluid medium by a craft,
   (b) a container mounted for reciprocating movement along said cable,
   (c) means for causing movement of said container along said cable whereby data can be systematically collected by instruments carried by the container without moving the tow cable relative to the craft, and
   (d) means cooperating with said means for causing movement of said container for changing the direction of movement of said container along said cable when said container reaches spaced points on the cable to automatically cause reciprocating movement of said container along said cable between said spaced points.

References Cited

UNITED STATES PATENTS

| Re. 25,165 | 5/1962 | Pulsifier | 114—235 |
| 2,679,227 | 5/1954 | Symonds | 43—42.03 X |
| 3,038,143 | 6/1962 | Dow | 340—5 |

RICHARD C. QUEISSER, *Primary Examiner.*

C. IRVIN McCLELLAND, *Assistant Examiner.*